United States Patent
Fässler et al.

(10) Patent No.: US 8,617,633 B2
(45) Date of Patent: Dec. 31, 2013

(54) PROCESS FOR GREEN TEA MANUFACTURE WITH MICROWAVE ROASTING

(75) Inventors: Caroline Fässler, Zürich (CH); Bruno Kümin, Dübendorf (CH)

(73) Assignee: Givaudan S.A., Vernier (CH)

( * ) Notice: Subject to any disclaimer, the term of this patent is extended or adjusted under 35 U.S.C. 154(b) by 0 days.

(21) Appl. No.: 13/636,481

(22) PCT Filed: Mar. 25, 2011

(86) PCT No.: PCT/EP2011/054590
§ 371 (c)(1),
(2), (4) Date: Oct. 22, 2012

(87) PCT Pub. No.: WO2011/117375
PCT Pub. Date: Sep. 29, 2011

(65) Prior Publication Data
US 2013/0280389 A1    Oct. 24, 2013

(30) Foreign Application Priority Data

Mar. 26, 2010    (GB) .................................... 1005072.2

(51) Int. Cl.
*A23F 3/12*    (2006.01)
(52) U.S. Cl.
USPC ............ 426/597; 426/241; 426/242; 426/243
(58) Field of Classification Search
USPC .................................. 426/597, 241, 242, 243
See application file for complete search history.

(56) References Cited

FOREIGN PATENT DOCUMENTS

| JP | 58-121753 A | 7/1983 |
|---|---|---|
| JP | 2000-004788 A | 1/2000 |
| JP | 2002-034455 A | 2/2002 |
| JP | 2002-034457 A | 2/2002 |
| JP | 2007028911 | * 2/2007 |
| JP | 2008263922 | * 11/2008 |
| WO | WO 2005/093352 A1 | 10/2005 |

OTHER PUBLICATIONS

English Translation for JP 2002-034455. Published Feb. 2002.*
English Translation for JP 2002-034457. Published Feb. 2002.*
GB 1005072.2-Great Britain Search Report, Jul. 22, 2010.
PCT/EP2011/054590-Written Opinion of the International Searching Authority, May 25, 2011.
PCT/EP2011/054590-International Search Report, May 25, 2011.
PCT/EP2011/054590-International Preliminary Report on Patentability, Oct. 2, 2012.
Kubota K., et al., "Effect of Refining Treatment With Microwave Heating Dram on Aroma and Taste of Green Tea", Abstract, Nippon Shokuhin Kagaku Kogaku Kaishi, vol. 43, No. 11, Jan. 1, 1996, pp. 1197-1204.
PCT/EP2011/054590—International Search Report, May 25, 2011.
PCT/EP2011/054590—International Written Opinion, May 25, 2011.
GB 1005072.2—Great Britain Search Report, Jul. 22, 2010.
Kubota K., et al, "Effect of refining treatment with microwave heating dram on aroma and taste of green tea", Nippon Shokuhin Kagaku Kogaku Kaishi, Journal of Japanese Society of Food Science and Technology, Japan, Jan. 1, 1996, vol. 43, No. 11, pp. 1197-1204.

* cited by examiner

*Primary Examiner* — Anthony Weier
(74) *Attorney, Agent, or Firm* — Curatolo Sidoti Co., LPA; Joseph G. Curatolo; Salvatore A. Sidoti

(57) ABSTRACT

A process of preparing a sencha green tea, including the treatment of fresh tea leaves by steaming, cooling, rolling and drying to give an aracha, followed by roasting to give a sencha, characterized in that (a) prior to roasting, (i) the aracha is finely ground; (ii) water is added to the aracha to the extent of at least 10% by weight; (iii) the aracha is stored for at least 2 days at a maximum temperature of room temperature; and (b) the aracha is then roasted using only microwaves under vacuum conditions, until the beginning of burning of the leaves is observed. The resulting sencha has an especially desirable roasted-green flavor.

7 Claims, No Drawings

PROCESS FOR GREEN TEA MANUFACTURE WITH MICROWAVE ROASTING

CROSS REFERENCE TO RELATED APPLICATIONS

This application is a national stage application of International Application No. PCT/EP2011/054590, filed 25 Mar. 2011, which claims priority from Great Britain Patent Application No. 1005072.2, filed 26 Mar. 2010, from which applications priority is claimed, and which are incorporated herein by reference.

This disclosure relates to a preparation of green tea.

Green tea consists of leaves of the tea bush *Camellia sinensis* that have undergone minimal fermentation during processing. One of the varieties of particular interest is sencha, a Japanese green tea, which is made without grinding the leaves, and which is a very popular beverage in Japan.

The normal processing of sencha involves a number of steps:
(a) steaming and cooling;
(b) rolling (several times);
(c) drying;
(d) roasting.

At the stage (c), the result is so-called "aracha", crude tea. At this point, the leaves have the characteristic final cylindrical shape. The final roasting stage (d) assists in preservation and adds flavour. This is typically carried out at 80°-100° C. typically using an oven that gives a combination of microwave and far-infrared heating.

It has now been found that a novel process can give a sencha with a particularly desirable fresh roast aroma. There is therefore provided a process of preparing a sencha green tea, comprising the treatment of fresh tea leaves by steaming, cooling, rolling and drying to give an aracha, followed by roasting to give a sencha, characterised in that
(a) prior to roasting,
  (i) the aracha is finely ground;
  (ii) water is added to the aracha to the extent of at least 10% by weight
  (iii) the aracha is stored for at least 2 days at a maximum temperature of room temperature;
and
(b) the aracha is roasted using only microwaves under vacuum conditions, until the beginning of burning of the leaves is observed.

The fineness of grind is not narrowly critical, an average size of from 0.1-3 mm being typical. However, these figures are given as general indications only, and, depending on circumstances, it may be found convenient to use smaller or coarser grinds.

The addition of water is critical to the attainment of the particular desired flavour quality. At least 10% water by weight must be added, typical proportions ranging from 15-25%. The upper limit of water addition is provided only by practical circumstances; it is possible to use 50% water, or even more, but no practical benefit is gained from such high proportions. In addition, it adds the problem that so much more energy is needed in the roasting stage to dispose of the surplus water.

The storage time should be at least two days. The maximum storage time will be determined by the needs of the production process and the necessity to prevent spoilage of the leaves taking place. In general, storage at room temperature can be for 5 days or even more, but no flavour benefit is obtained from longer storage times.

The storage is at a maximum of room temperature, which, for the purposes of this disclosure is from 20°-25° C. Higher storage temperatures than 25° C. may be possible in some circumstances, but they may result in a more rapid onset of spoilage. Should longer storage times be necessary, it may be advantageous to store the aracha at reduced temperature, below 10° C. and more particularly below 5° C. This can assist in the preservation of the aracha, which, under certain conditions, can start to spoil. The time and temperature of storage may be determined in every case by routine experimentation.

After storage, the aracha is loaded into a microwave oven for roasting. One of the surprising features of the method is the use of microwaves alone for the roasting process. Normally microwaves, which rely on their effect by vibrating water molecules and therefore causing heating, are not considered to be a means of roasting. However, under the conditions of this process, roasting does take place, without the necessity for further roasting.

The critical condition to be observed is that the roasting is deemed complete when the beginning of burning of the leaves is observed. As soon as this occurs, the heating is finished and the microwave oven is switched off. Again, the point at which this occurs may be determined in every case by simple, non-inventive experimentation. One of the indicators that the process of roasting is complete is the temperature of the leaves. When the water has evaporated from the leaves, their temperature starts to rise. When this temperature reaches a temperature in the vicinity of 150° to 170° C., the process is complete, or very nearly complete.

The roasting should take place under vacuum. By vacuum is meant a pressure less than that of atmospheric. A suitable pressure may be readily determined by routine experimentation, but a typical value is from 3-7 KPa.

The result is a sencha with a desirable combination of roasted character and noticeable green notes.

In a further embodiment, the microwave roasting hereinabove described may be optionally supplemented by a further roasting step. This may be performed by any suitable method, one such particular method being induction heating, but other methods include conduction and convection heating.

Such a further heating reduces the green character and strengthens the roasted character.

The process is further described with reference to the following non-limiting example.

EXAMPLE

An aracha tea prepared by the methods known to the art is finely ground to an average size of from 0.1-3 mm. The resulting ground aracha is thoroughly blended with 20% by weight of water and stored for 4 days at 5° C. At the end of the storage period, the aracha is loaded on to drying trays and placed in a 48 kW microwave oven. The pressure is reduced to 3 kPa and the oven switched on. When the temperature of the leaves, as measured by a temperature sensor in the top leaf tray, shows 160° C. (after 32.5 min), the leaves are examined and it is found that a small proportion of the leaves has started to burn. The heating is switched off and the trays removed and allowed to cool.

The sencha thus prepared is made into a drink and presented to a experienced tasting panel, along with a sencha prepared from the same aracha, but by the conventional methods. The panel found that the sencha prepared by the process as described above had a fresh sencha roast aroma that was missing from the conventionally-prepared sencha.

The invention claimed is:

1. A process of preparing a sencha green tea, comprising the treatment of fresh tea leaves by steaming, cooling, rolling and drying to give an aracha, followed by roasting to give a sencha, wherein
   (a) prior to roasting,
      (i) the aracha is finely ground;
      (ii) water is added to the aracha to the extent of at least 10% by weight; and
      (iii) the aracha is stored for a minimum of 2 days at a maximum temperature room temperature;
   and
   (b) the aracha is then roasted using only microwaves under vacuum conditions, until the beginning of burning of the leaves is observed.

2. The process according to claim 1, in which the proportion of water added is from 15-25%.

3. The process according to claim 1, in which the storage takes place at 20°-25° C.

4. The process according to claim 1, in which the storage takes place at reduced temperature.

5. The process according to claim 1, in which the vacuum is from 3-7 KPa.

6. The process according to claim 4, in which the storage takes place below 10° C.

7. The process according to claim 4, in which the storage takes place below 5° C.

* * * * *